Sept. 8, 1925.

C. W. HART 1,552,925

SOLDERING IRON CAKE

Filed March 31, 1925

INVENTOR
Coleridge W. Hart
BY
Howser Anderson
ATTORNEY

Patented Sept. 8, 1925.

1,552,925

UNITED STATES PATENT OFFICE.

COLERIDGE W. HART, OF PEEKSKILL, NEW YORK.

SOLDERING-IRON CAKE.

Application filed March 31, 1925. Serial No. 19,595.

*To all whom it may concern:*

Be it known that I, COLERIDGE W. HART, a citizen of the United States, residing at Peekskill, in the county of Westchester and State of New York, have invented new and useful Improvements in Soldering-Iron Cakes, of which the following is a specification.

This invention relates to the operation of soldering metals, and has for its object to facilitate the tinning of soldering irons. The object is attained by the means set forth in the accompanying drawings and this specification, in both of which like letters refer to similar parts in the several views.

Figure 1:
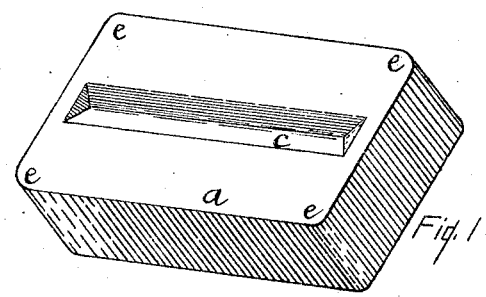
Figure 2:
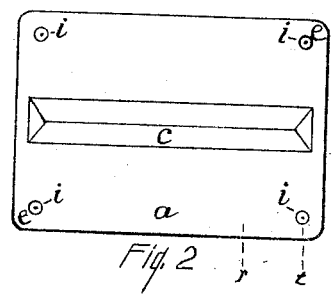
Figure 3:
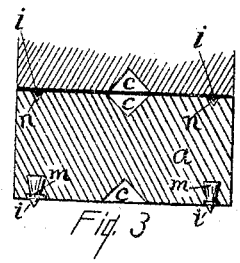
Figure 4:
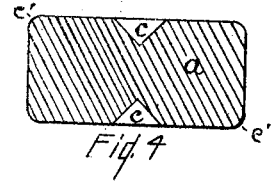
Figure 5:
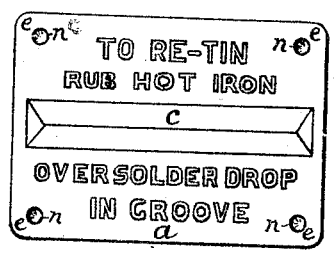

Fig. 1 is a perspective view of the soldercake. Fig. 2 is a plan of the Fig. 1. Fig. 3 is a transverse section of Fig. 2 through the line $t$. Fig. 4 in a transverse section of Fig. 2 through line $r$. Fig. 5 is a plan of the soldercake bearing directions for its use.

Salammoniac is the most commonly used flux in the cleansing and tinning of soldering irons. To use the material as ground for commerce it is inconvenient and wasteful. To use it in its crystal form it is decidedly inconvenient and is not always obtainable. $a$, Fig. 1, of the drawings shows a cake or block formed by submitting pulverized salammoniac to great pressure in specially shaped moulds. Only about one per cent of a foreign matter is mixed with the salammoniac as a binder, a mixture that in no way detracts from the chemical action of the salammoniac upon the soldering iron in the iron tinning process; but it is great pressure that is especially relied upon to give adherence to the particles forming the cake, and the solidity of the soldercake.

Fig. 1 illustrates a soldercake of about the natural size, rectangular in form, with the corners of the ends, $e, e, e, e$ rounded. A V groove $c$ extends transversely of the length of the cake. The sides of the groove incline at a right angle to adapt it to the usual shapes of soldering iron points. A groove is provided upon both sides of the cakes, as in Figs. 3 and 4, Fig. 1 showing the reverse side of the soldercake.

As a means for securing the soldercake against movement on a bench while being rubbed with a soldering iron, non-corrosive points $i\ i$, Figs. 2 and 3, are secured in the material of the soldercake during the process of forming the cake. The points consist of a body $m$ shaped to be held firmly by the surrounding material, the bodies terminating in the points $i$.

As the projecting points $i$ are calculated to prevent closely stacking the soldercakes in packing for transportation, the side of the soldercake opposite the points, is provided with recesses $n\ n$, as in Figs. 3 and 5, so that the points upon one soldercake will lie within the recesses upon the other, as in Fig. 3.

In the making of these soldercakes, directions for their use are impressed in the surface of the soldercake, as in Fig. 5. This is for the benefit of amateurs and those inexperienced in the art, since the popularity of the "radio" has made it important for many of its users to become familiar with processes which require the handling of solder and soldering irons.

In the Figs. 1, 2 and 3, the end corners $e$ are shown to be rounded. In Fig. 4 the side corners $e'$ are shown as also rounded. There are die difficulties in thus rounding all the corners of the soldercakes, but when such rounding is desirable it can be easily done by grinding or otherwise abrading them.

Having described the invention, what I claim and desire to secure by Letters Patent, is—

1. A soldercake consisting of salammoniac compressed into the form of a rectangular block, an angular groove on each side longitudinally of the block, and non-corrosive points secured in one side of the block.

2. A soldercake consisting of salammoniac compressed into the form of a rectangular block, an angular groove in each side of the block, non-corrosive points in one side of the block, and recesses on the opposite side of the block corresponding with the said points.

Signed at Peekskill, in the county of Westchester and State of New York, this 14th day of March, 1925.

COLERIDGE W. HART.